United States Patent
Huang et al.

(10) Patent No.: US 8,787,040 B2
(45) Date of Patent: Jul. 22, 2014

(54) VOLTAGE-REGULATING CIRCUIT WITH INPUT VOLTAGE DETECTING CIRCUIT AND PARALLEL VOLTAGE-REGULATING CIRCUIT SYSTEM USING THE SAME

(75) Inventors: Guisong Huang, Shanghai (CN); Yahong Xiong, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 497 days.

(21) Appl. No.: 12/845,898

(22) Filed: Jul. 29, 2010

(65) Prior Publication Data
US 2011/0026275 A1 Feb. 3, 2011

Related U.S. Application Data

(60) Provisional application No. 61/229,376, filed on Jul. 29, 2009.

(51) Int. Cl.
*H02M 3/335* (2006.01)
*G05F 5/00* (2006.01)
*H02M 1/00* (2006.01)

(52) U.S. Cl.
CPC .. *H02M 3/33576* (2013.01); *H02M 2001/0022* (2013.01)
USPC ............... 363/17; 363/65; 323/266; 323/272; 323/299

(58) Field of Classification Search
USPC ................. 323/266, 272, 299; 363/17, 21.04, 363/21.09, 21.12, 21.16, 65, 98, 132
See application file for complete search history.

(56) References Cited

U.S. PATENT DOCUMENTS

| | | | |
|---|---|---|---|
| 6,278,263 B1 * | 8/2001 | Walters et al. | 323/272 |
| 6,944,034 B1 * | 9/2005 | Shteynberg et al. | 363/21.13 |
| 7,280,376 B2 * | 10/2007 | McDonald et al. | 363/20 |
| 8,098,506 B2 * | 1/2012 | Saint-Pierre | 363/97 |
| 8,320,145 B2 * | 11/2012 | Horii | 363/89 |
| 2005/0286271 A1 * | 12/2005 | Vinciarelli | 363/17 |
| 2008/0193150 A1 * | 8/2008 | Matsumoto | 399/31 |
| 2008/0247194 A1 * | 10/2008 | Ying et al. | 363/17 |
| 2008/0266907 A1 * | 10/2008 | Kim et al. | 363/21.1 |

FOREIGN PATENT DOCUMENTS

| | | |
|---|---|---|
| CN | 1295374 | 5/2001 |
| JP | H11187662 | 7/1999 |
| JP | 2000139079 | 5/2000 |
| WO | WO 2009069647 A1 * | 6/2009 |

* cited by examiner

*Primary Examiner* — Fred E Finch, III
(74) *Attorney, Agent, or Firm* — Kirton McConkie; Evan R. Witt

(57) ABSTRACT

A voltage-regulating circuit according to the present invention includes a power conversion circuit, an input voltage detecting circuit and a feedback circuit. The power conversion circuit includes at least one switch element, wherein during operation of the at least one switch element, an input voltage is converted into a transition voltage. The input voltage detecting circuit is connected to the power conversion circuit for outputting a detected voltage signal corresponding to the input voltage. The feedback circuit is connected to the power conversion circuit and the input voltage detecting circuit for generating a feedback control signal. In such way, as the input voltage is changed, the feedback circuit will adjust to make the transition voltage changed as with the change of the detected voltage signal corresponding to the input voltage.

30 Claims, 17 Drawing Sheets

US 8,787,040 B2

VOLTAGE-REGULATING CIRCUIT WITH INPUT VOLTAGE DETECTING CIRCUIT AND PARALLEL VOLTAGE-REGULATING CIRCUIT SYSTEM USING THE SAME

CROSS-REFERENCE TO RELATED APPLICATION

This application claims the benefit of U.S. Provisional Application No. 61/229,376, filed on Jul. 29, 2009, and entitled "A HIGH EFFICIENCY POWER CONVERTER", the entirety of which is hereby incorporated by reference.

FIELD OF THE INVENTION

The present invention relates to a voltage-regulating circuit, and more particularly to a voltage-regulating circuit with an input voltage detecting circuit with reduced power loss and enhanced performance. The present invention also relates to a parallel voltage-regulating circuit system having such a voltage-regulating circuit.

BACKGROUND OF THE INVENTION

As known, a distributed power system is gradually used in many electronic devices because of high operating efficiency, high reliability and cost-effectiveness. Since the power loss provided by individual power source of the distributed power system and the heat caused by the distributed power system are both low, the distributed power system is superior to the centralized power system. Since the efficiency for distributing the power by the distributed power system is very high, the adverse effect resulted from the breakdown of the distributed power system is very low, and thus the reliability of the electronic device is enhanced.

For providing more stable voltage conversion, increased powering rating and reduced fabricating cost, the distributed power system is continuously improved. Recently, an intermediate bus power system is provided.

The intermediate bus power system comprises a front-stage voltage-regulating circuit and at least one rear-stage converting circuit. The front-stage voltage-regulating circuit comprises at least one switch element. During operation of the switch element, the input voltage received by the front-stage voltage-regulating circuit is converted into a transition voltage with a fixed value. The rear-stage converting circuit is connected to the front-stage voltage-regulating circuit for receiving the transition voltage and converting the transition voltage into a working voltage required for powering individual load (e.g. 1.8V, 3.3V or 5V). Since the input voltage is converted into the transition voltage by the front-stage voltage-regulating circuit, the transition voltage can be converted into the working voltage by the rear-stage converting circuit without the need of directly converting the input voltage. Under this circumstance, the loss generated during the conversion is performed by the rear-stage converting circuit will be reduced and the rear-stage converting circuit may be implemented by cost-effective components.

For maintaining the transition voltage to be equal to the fixed value, the duty cycle of the switch element is usually adjusted to comply with different levels of the input voltage. For example, if the input voltage is continuously increased, the duty cycle of the switch element of the front-stage voltage-regulating circuit is gradually decreased. Whereas, if the input voltage is continuously decreased, the duty cycle of the switch element of the front-stage voltage-regulating circuit is gradually increased. In other words, by adjusting the duty cycle of the switch element, the input voltage can be converted to the rated voltage value by the front-stage voltage-regulating circuit. However, if the input voltage is too large, the duty cycle of switch element of the front-stage voltage-regulating circuit is adjusted to be very small. Under this circumstance, the front-stage voltage-regulating circuit has increased conduction loss, switching loss and filtering loss, the operating performance is impaired.

Therefore, there is a need of providing an improved front-stage voltage-regulating circuit to obviate the drawbacks encountered from the prior art.

SUMMARY OF THE INVENTION

The present invention provides a voltage-regulating circuit with an input voltage detecting circuit. The output voltage regulation is reference to the input voltage variation, and as the input voltage is increased, the duty cycle of the switch element is controlled to be higher than a preset duty cycle. In this way, the voltage-regulating circuit with an input voltage detecting circuit of the present invention has reduced conduction loss, switching loss and filtering loss and enhanced operating performance.

In accordance with an aspect of the present invention, there is provided a voltage-regulating circuit. The voltage-regulating circuit includes a power conversion circuit, an input voltage detecting circuit and a feedback circuit. The power conversion circuit includes at least one switch element, wherein during operation of the at least one switch element, an input voltage is converted into a transition voltage. The input voltage detecting circuit is connected to the power conversion circuit for outputting a detected voltage signal corresponding to the input voltage. The feedback circuit is connected to the power conversion circuit and the input voltage detecting circuit for generating a feedback control signal. As the input voltage is changed, as a result the feedback circuit will adjust to make the transition voltage changed as with the change of the detected voltage signal corresponding to the input voltage.

In accordance with another aspect of the present invention, there is provided a parallel voltage-regulating circuit system. The parallel voltage-regulating circuit system includes plural parallel voltage-regulating circuits, a power conversion circuit, a voltage-detecting circuit, a current-detecting circuit and a feedback circuit. Each of the voltage regulating circuits includes a power conversion circuit, an input voltage-detecting circuit, a current-detecting circuit and a feedback circuit. The power conversion circuit includes at least one switch element, wherein during operation of the at least one switch element, an input voltage is converted into a transition voltage with an output current. The input voltage detecting circuit is connected to the power conversion circuit for outputting a detected voltage signal corresponding to the input voltage. The current-detecting circuit is connected to the power conversion circuit for outputting a detected current signal corresponding to the output current. The feedback circuit is connected to the power conversion circuit, the input voltage detecting circuit and the current-detecting circuit for generating a feedback control signal. As the input voltage or the output current is changed, the feedback circuit will adjust to make the transition voltage changed as with the change of the detected voltage signal corresponding to the input voltage or the change of the detected current signal corresponding to the output current.

In accordance with a further aspect of the present invention, there is a parallel voltage-regulating circuit system. The parallel voltage-regulating circuit system includes plural parallel voltage-regulating circuits, a power conversion circuit, a voltage-detecting circuit, a current-detecting circuit and a feedback circuit. The plural voltage-regulating circuits are parallel and connected together by a current sharing bus. Each of the voltage regulating circuits includes a power conversion circuit, an input voltage-detecting circuit, a current-detecting circuit and a feedback circuit. The power conversion circuit includes at least one switch element, wherein during operation of the at least one switch element, an input voltage is converted into a transition voltage with an output current. The input voltage detecting circuit is connected to the power conversion circuit for outputting a detected voltage signal corresponding to the input voltage. The current-detecting circuit is connected to the power conversion circuit for outputting a detected current signal corresponding to the output current. As the input voltage is changed, the feedback circuit will adjust to make the transition voltage changed as with the change of the detected voltage signal corresponding to the input voltage. As the detected current signal is not equal to a signal on the current sharing bus, the feedback circuit will adjust to make the detected current signal equal to the signal on the current sharing bus.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
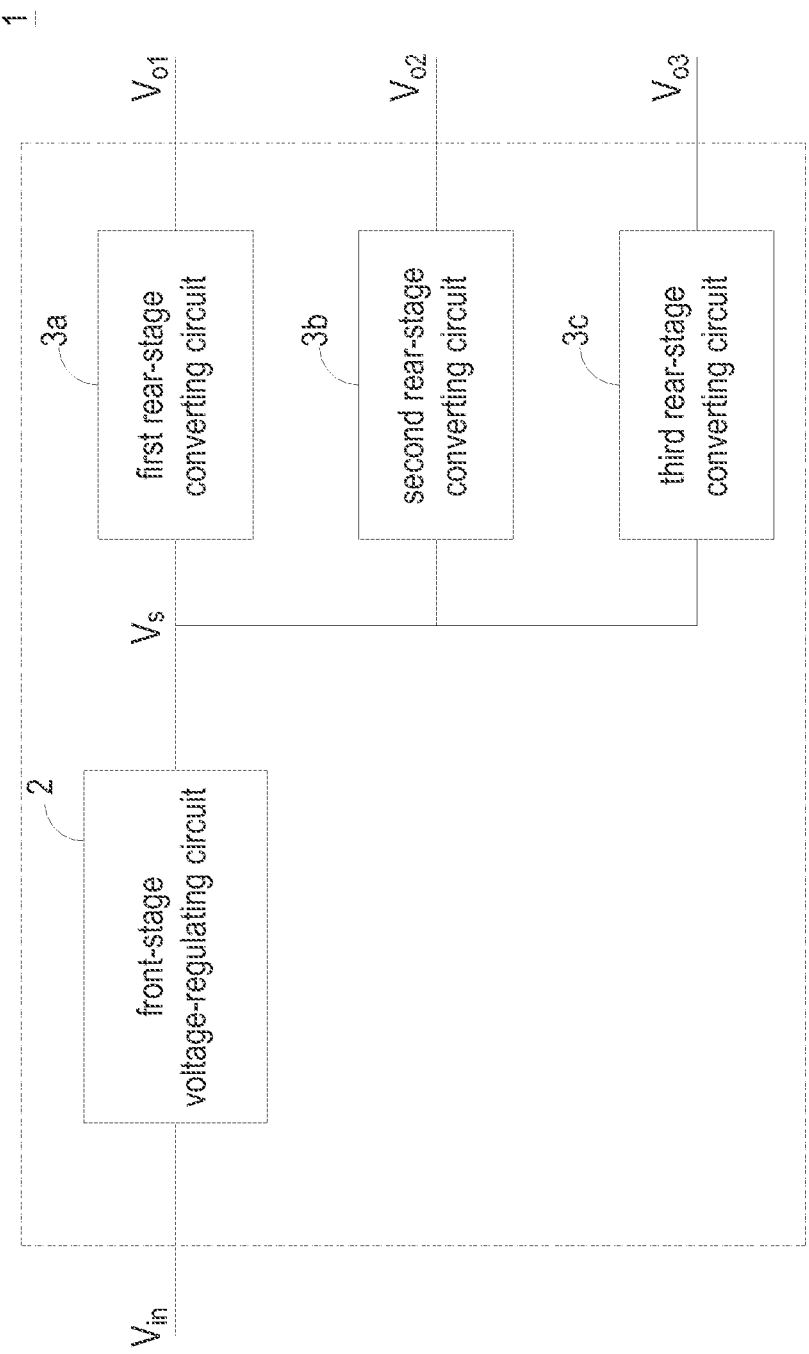
FIG. 1 is a block diagram illustrating an intermediate bus power system according to an embodiment of the present invention.

FIG. 1 is a block diagram illustrating an intermediate bus power system according to an embodiment of the present invention. As shown in FIG. 1, the intermediate bus power system 1 comprises a front-stage voltage-regulating circuit 2 and at least one rear-stage converting circuit. The front-stage voltage-regulating circuit 2 is used for receiving an input voltage $V_{in}$ and converting the input voltage $V_{in}$ into a transition voltage $V_s$. The at least one rear-stage converting circuit comprises a first rear-stage converting circuit 3a, a second rear-stage converting circuit 2b and a third rear-stage converting circuit 3c. The first rear-stage converting circuit 3a, the second rear-stage converting circuit 2b and the third rear-stage converting circuit 3c are connected to the front-stage voltage-regulating circuit 2 for receiving the transition voltage $V_s$ and converting the transition voltage $V_s$ into working voltages required for powering respective loads (not shown). In this embodiment, a first working voltage $V_{o1}$, a second working voltage $V_{o2}$ and a third working voltage $V_{o3}$ are outputted from the first rear-stage converting circuit 3a, the second rear-stage converting circuit 3b and the third rear-stage converting circuit 3c, respectively.

In some embodiments, the rear-stage converting circuits 3a, 3b and 3c are non-isolated converters. Especially, the rear-stage converting circuits 3a, 3b and 3c are non-isolated DC/DC converters. In an embodiment, the first working voltage $V_{o1}$, the second working voltage $V_{o2}$ and the third working voltage $V_{o3}$ are 1V, 3.3V and 5V, respectively.

Figure 2:
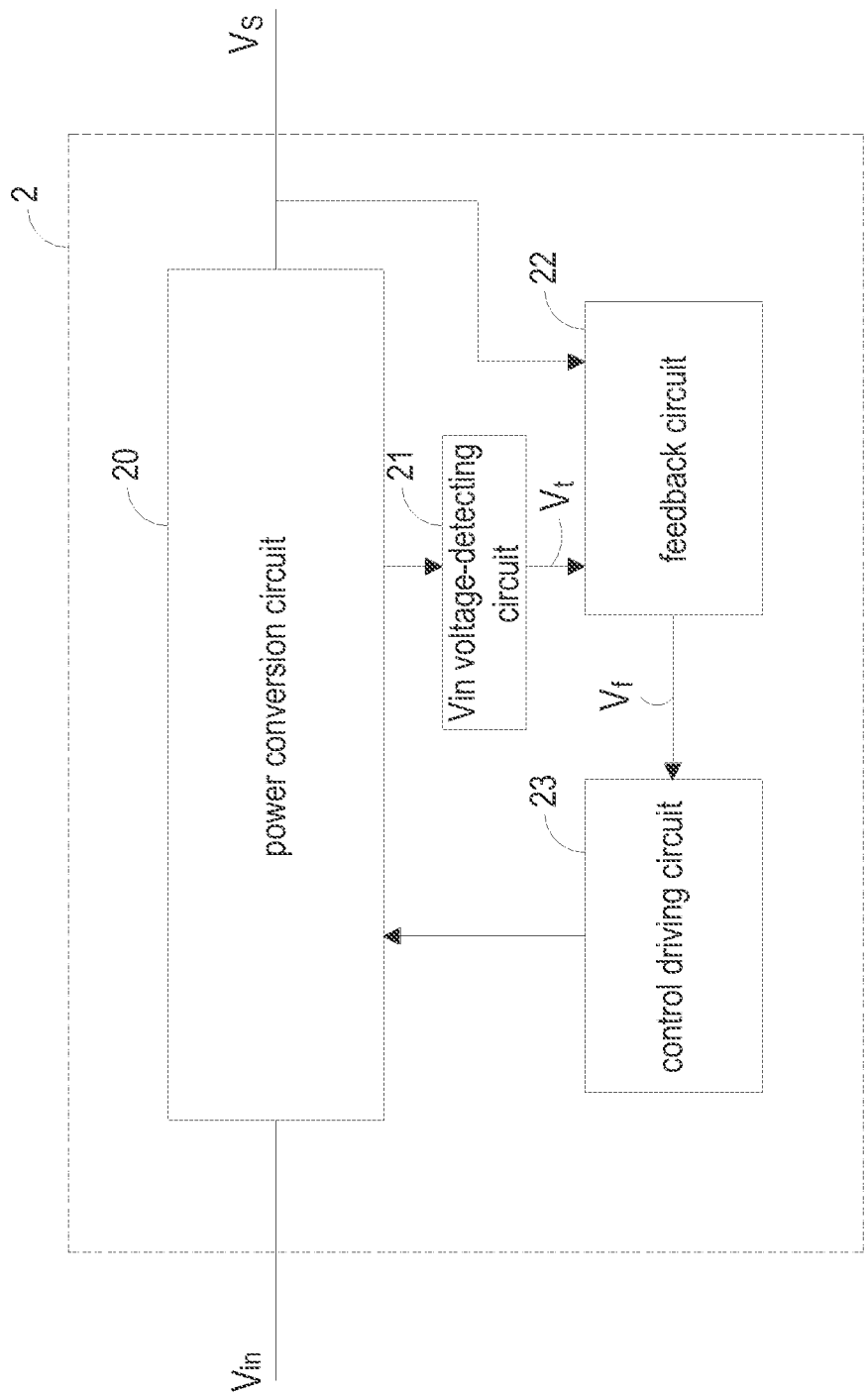
FIG. 2 is a block diagram illustrating the front-stage voltage-regulating circuit of the intermediate bus power system as shown in FIG. 1.

FIG. 2 is a block diagram illustrating the front-stage voltage-regulating circuit of the intermediate bus power system as shown in FIG. 1. As shown in FIG. 2, the front-stage voltage-regulating circuit 2 comprises a power conversion circuit 20, a Vin voltage-detecting circuit 21 (i.e. input voltage detecting circuit), a feedback circuit 22 and a control driving circuit 23. The power conversion circuit 20 comprises at least one switch element (not shown). The at least one switch element is alternately conducted or shut off, so that the input voltage $V_{in}$ is converted into the transition voltage $V_s$. The $V_{in}$ voltage-detecting circuit 21 is connected to the power conversion circuit 20 for detecting a conversion voltage corresponding to the input voltage $V_{in}$, thereby outputting a detected vin signal $V_t$. The feedback circuit 22 is connected to the power conversion circuit 20 and the $V_{in}$ voltage-detecting circuit 21. According to the detected vin signal $V_t$ and the transition voltage $V_s$, the feedback circuit 22 generates a feedback control signal $V_f$. The control driving circuit 23 is connected to the power conversion circuit 20 and the feedback circuit 22 for receiving the feedback control signal $V_f$, and controlling the duty cycle of the switch element according to the feedback control signal $V_f$. According to the duty cycle of the switch element, the power conversion circuit 20 outputs the transition voltage $V_s$.

As the input voltage $V_{in}$ increases, the detected vin signal $V_t$ is increased in response to the input voltage $V_{in}$, and the feedback control signal $V_f$ is changed in response to the detected vin signal $V_t$. Meanwhile, according to the feedback control signal $V_f$, the control driving circuit 23 controls the duty cycle of the switch element to be higher than a preset duty cycle. As a consequence, the front-stage voltage-regulating circuit 2 of the present invention has reduced conduction loss, switching loss and filtering loss and enhanced operating performance.

Figure 3:
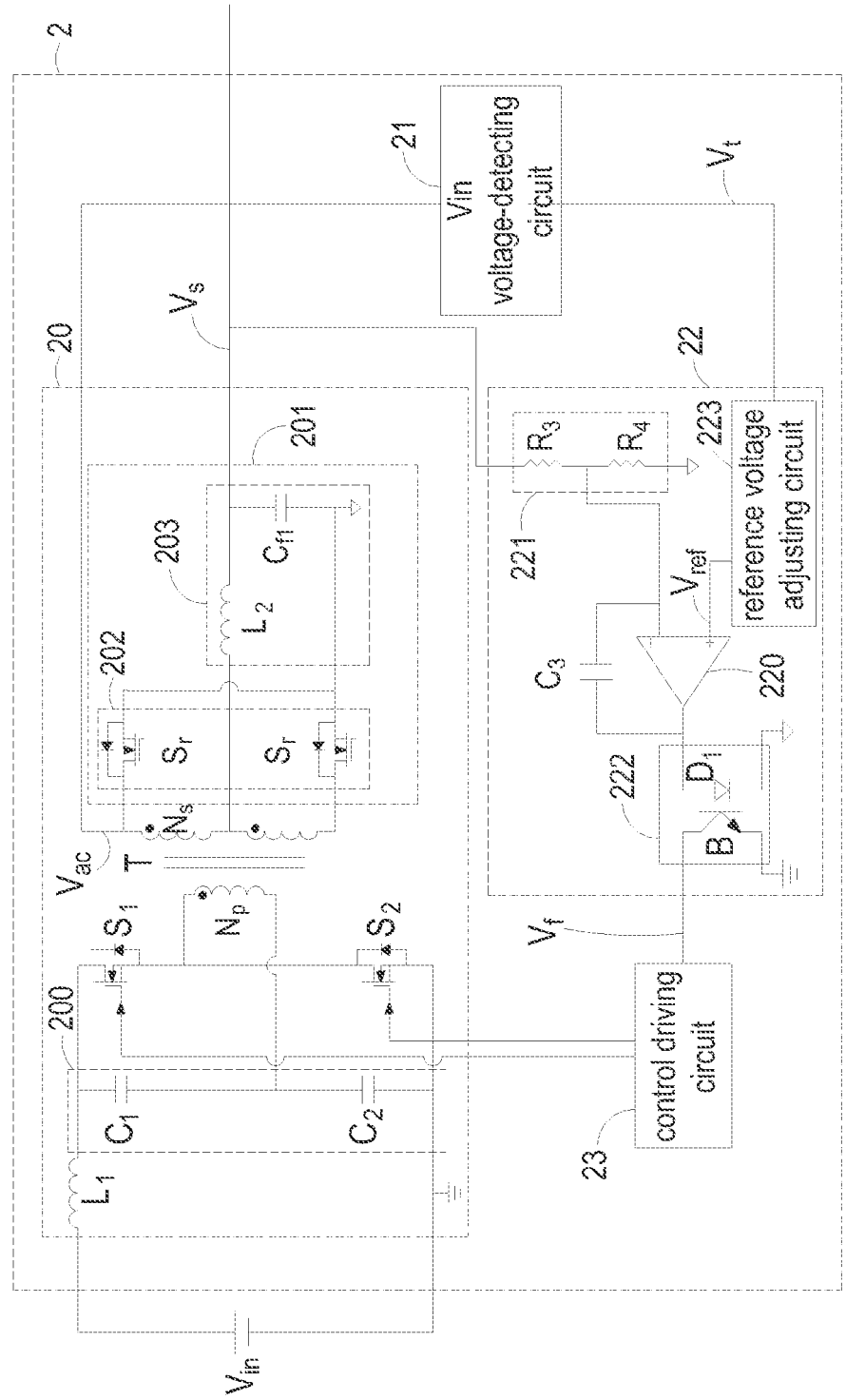
FIG. 3 is a schematic detailed circuit diagram illustrating the front-stage voltage-regulating circuit as shown in FIG. 2.

FIG. 3 is a schematic detailed circuit diagram illustrating the front-stage voltage-regulating circuit as shown in FIG. 2. Please refer to FIGS. 2 and 3. The power conversion circuit 20 is a pulse width modulate half bridge converter, comprises a first filtering inductor $L_1$, a first voltage-division circuit 200, at least one switch element, a transformer T and a secondary-side circuit 201. The first filtering inductor $L_1$ is used for filtering the input current. The first voltage-division circuit 200 is connected to the first filtering inductor $L_1$. By the first voltage-division circuit 200, the input voltage $V_{in}$ is subject to voltage division, and the divided voltage is transmitted to a primary winding $N_p$ of the transformer T. In this embodiment, the first voltage-division circuit 200 comprises a first capacitor $C_1$ and a second capacitor $C_2$, which are connected with each other in series. The at least one switch element comprises a first switch element $S_1$ and a second switch element $S_2$, which are connected to the first voltage-division circuit 200, the primary winding $N_p$ of the transformer T and the control driving circuit 23. Under control of the control driving circuit 23, the first switch element $S_1$ and the second switch element $S_2$ are conducted or shut off, so that the electric energy of the input voltage $V_{in}$ is selectively transmitted to the primary winding $N_p$ of the transformer T through the first switch element $S_1$ and the second switch element $S_2$. As such, an induction AC voltage $V_{ac}$ is outputted from the secondary winding $N_s$ of the transformer T. In this embodiment, the first switch element $S_1$ and the second switch element $S_2$ are alternately conducted or shut off.

The secondary-side circuit 201 is connected to the secondary winding $N_s$ of the transformer T for rectifying and filtering the induction AC voltage $V_{ac}$, thereby generating the transition voltage $V_s$. In this embodiment, the secondary-side circuit 201 comprises a synchronous rectifying circuit 202 and a filtering circuit 203. The synchronous rectifying circuit 202 is connected to the secondary winding $N_s$ of the transformer T for performing synchronous rectification. In this embodiment, the synchronous rectifying circuit 202 comprises plural synchronous rectifier switches $S_r$. The filtering circuit 203 is connected to the synchronous rectifying circuit 202 for filtering. In this embodiment, the filtering circuit 203 comprises a first filtering capacitor $C_{f1}$ and a second filtering inductor $L_2$.

As shown in FIG. 3, the power conversion circuit 20 is a pulse width modulate half bridge converter. In some embodiments, it can be any pulse width modulate converter, for example Forward converter, Flyback converter, Full bridge converter, and so on. Furthermore, the power conversion circuit 20 also can be any pulse frequency modulate resonant converter, for example series resonant converter, parallel resonant converter, LCC parallel resonant converter, LLC series resonant converter, and so on.

Figure 4:
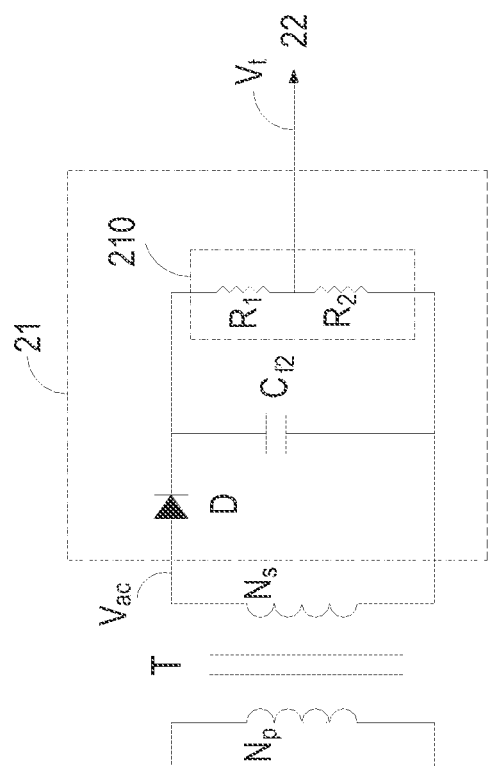
FIG. 4 is a schematic detailed circuit diagram illustrating the Vin voltage-detecting circuit of the front-stage voltage-regulating circuit as shown in FIG. 3.

FIG. 4 is a schematic detailed circuit diagram illustrating a kind of $V_{in}$ voltage-detecting circuit of the front-stage voltage-regulating circuit as shown in FIG. 3. Please refer to FIGS. 2, 3 and 4. The $V_{in}$ voltage-detecting circuit 21 is connected to the secondary winding $N_s$ of the transformer T. That is, the conversion voltage detected by the $V_{in}$ voltage-detecting circuit 21 is the induction AC voltage $V_{ac}$ from the secondary winding $N_s$ of the transformer T. As such, the magnitude of the induction AC voltage $V_{ac}$ is associated with the magnitude of the input voltage V. In addition, the detected vin signal $V_t$ outputted from the $V_{in}$ voltage-detecting circuit 21 by detecting the induction AC voltage $V_{ac}$ is also associated with the magnitude of the input voltage $V_{in}$.

The $V_{in}$ voltage-detecting circuit 21 comprises a rectifier diode D, a second filtering capacitor $C_{f2}$ and a second voltage-division circuit 210. The anode of the rectifier diode D is connected to the secondary winding $N_s$ of the transformer T. The rectifier diode D is used for rectification. The second filtering capacitor $C_{f2}$ is connected with the cathode of the rectifier diode D. The second filtering capacitor $C_{f2}$ is used for filtering. The second voltage-division circuit 210 is connected with the cathode of the rectifier diode D, the second filtering capacitor $C_{f2}$ and the feedback circuit 22. In this embodiment, the second voltage-division circuit 210 comprises a first resistor $R_1$ and a second resistor $R_2$, which are connected with each other in series. By the second voltage-division circuit 210, the voltage rectified by the rectifier diode D and filtered by the second filtering capacitor $C_{f2}$ is subject to voltage division, thereby outputting the detected vin signal $V_t$ to the feedback circuit 22.

As shown in FIG. 3, the $V_{in}$ voltage-detecting circuit 21 is connected to the secondary winding $N_s$ of the transformer T for sensing the induction AC voltage $V_{ac}$ and outputting the detected vin signal $V_t$. In some embodiments, the $V_{in}$ voltage-detecting circuit 21 can be variant embodiment, and is connected to the input terminal of L1, or the mid point of first voltage-division circuit 200, or the additional primary winding of the transformer T, or the additional secondary winding of the transformer T, or the synchronous rectifying circuit 202. In this situation, the detected $V_{in}$ signal detected by the $V_{in}$ voltage-detecting circuit 21 is the voltage at such position.

Please refer to FIG. 3 again. The feedback circuit 22 comprises a first operational amplifier 220, a third capacitor $C_3$, a third voltage-division circuit 221, a photo coupler 222 and a reference voltage adjusting circuit 223. The third voltage-division circuit 221 is connected to the secondary-side circuit 201 of the power conversion circuit 20 and a negative input terminal of the first operational amplifier 220. By the third voltage-division circuit 221, the transition voltage $V_s$ outputted from the secondary-side circuit 201 is subject to voltage division, thereby generating the divided transition voltage V. The divided transition voltage $V_s$ is provided to the negative input terminal of the first operational amplifier 220. In this embodiment, the voltage-division circuit 221 comprises a third resistor $R_3$ and a fourth resistor $R_4$, which are connected with each other in series. The third capacitor $C_3$ is connected with the negative input terminal and the output terminal of the first operational amplifier 220. The input terminal of the photo coupler 222 (i.e. the positive end of the light emitting diode $D_1$) is connected to the output terminal of the first operational amplifier 220. The output terminal of the photo coupler 222 (i.e. an end of an optical transistor B) is connected to the control driving circuit 23. The reference voltage adjusting circuit 223 is electrically interconnected between the positive input terminal of the first operational amplifier 220 and the $V_{in}$ voltage-detecting circuit 21 for receiving the detected vin signal $V_t$, and outputting a reference voltage $V_{ref}$ according to the detected vin signal $V_t$. By the first operational amplifier 220, the divided transition voltage $V_s$ from the third voltage-division circuit 221 is compared with the reference voltage $V_{ref}$. According to the comparing result, the photo coupler 222 outputs the feedback control signal $V_f$. According to the feedback control signal $V_f$, the duty cycles of the first switch element $S_1$ and the second switch element $S_2$ are adjusted, so that the transition voltage $V_s$ is regulated. In this situation, the divided transition voltage $V_s$ from the third voltage-division circuit 221 is substantially equal to the reference voltage $V_{ref}$.

Figure 5:
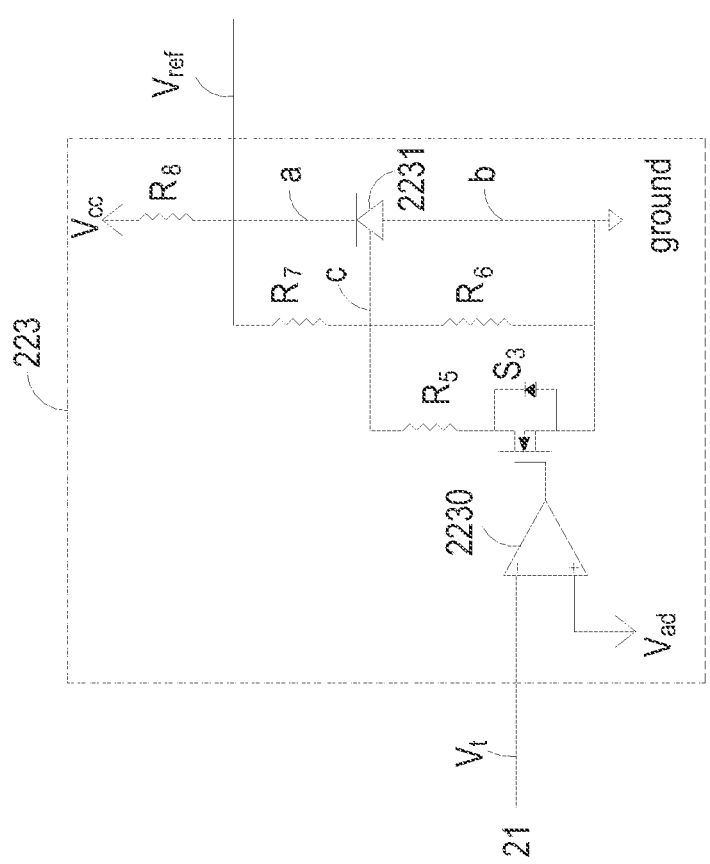
FIG. 5 is a schematic detailed circuit diagram illustrating the reference voltage adjusting circuit of the front-stage voltage-regulating circuit as shown in FIG. 3.

FIG. 5 is a schematic detailed circuit diagram illustrating the reference voltage adjusting circuit of the front-stage voltage-regulating circuit as shown in FIG. 3. Please refer to FIGS. 2, 3, 4 and 5. The reference voltage adjusting circuit 223 comprises a comparator 2230, a voltage-adjustable switch element $S_3$, a voltage-adjustable regulator 2231, a first voltage-adjustable resistor $R_5$, a second voltage-adjustable resistor $R_6$, a third voltage-adjustable resistor $R_7$ and a fourth voltage-adjustable resistor $R_8$. The fourth voltage-adjustable resistor $R_8$ is connected with a DC voltage source to receive a DC voltage $V_{cc}$. An example of the voltage-adjustable regulator 2231 is a LM4041 IC (National Semiconductor). A cathode "a" of the voltage-adjustable regulator 2231 is connected to the positive input terminal of the first operational amplifier 220 and the fourth voltage-adjustable resistor $R_8$. An anode "b" of the voltage-adjustable regulator 2231 is connected to ground. A feedback terminal "c" is connected to the first voltage-adjustable resistor $R_5$. The third voltage-adjustable resistor $R_7$ is interconnected between the cathode "a" and the feedback terminal "c" of the voltage-adjustable regulator 2231, and connected to the positive input terminal of the first operational amplifier 220 for outputting the reference voltage $V_{ref}$. The second voltage-adjustable resistor $R_6$ is interconnected between the feedback terminal c and the anode b of the voltage-adjustable regulator 2231. As such, the voltage difference between both ends of the second voltage-adjustable resistor $R_6$ is adjusted to a constant voltage value (e.g. 1.225V). The first voltage-adjustable resistor $R_5$ is connected to the voltage-adjustable switch element $S_3$ in series. The first voltage-adjustable resistor $R_5$ and voltage-adjustable switch element $S_3$ are serially connected between the feedback terminal "c" and the anode "b" of the voltage-adjustable regulator 2231. A preset voltage $V_{ad}$ is inputted into the positive input terminal of the comparator 2230. The negative input terminal of the comparator 2230 is connected to the $V_{in}$ voltage-detecting circuit 21 for receiving the detected vin signal $V_t$.

Figure 6:
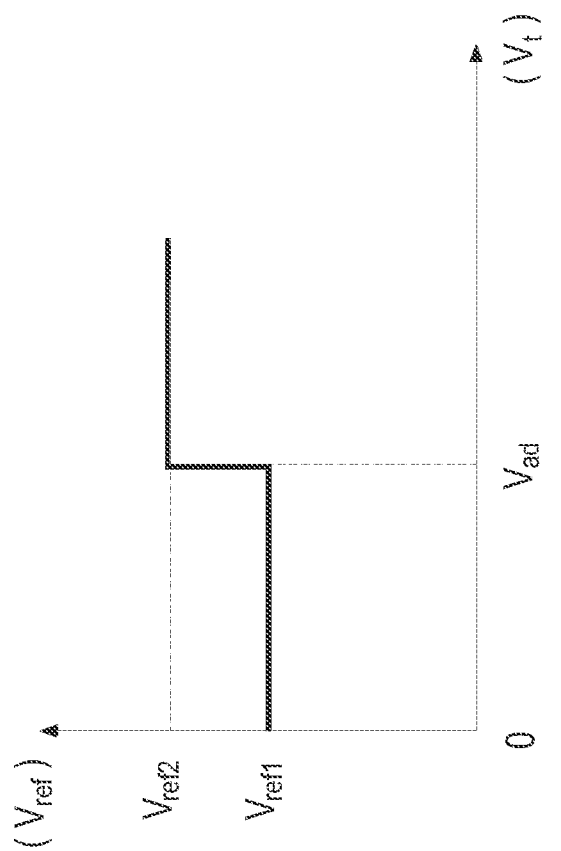
FIG. 6 is a plot illustrating the relation between the reference voltage and the detected vin signal of the front-stage voltage-regulating circuit as shown in FIG. 3.
Figure 7:
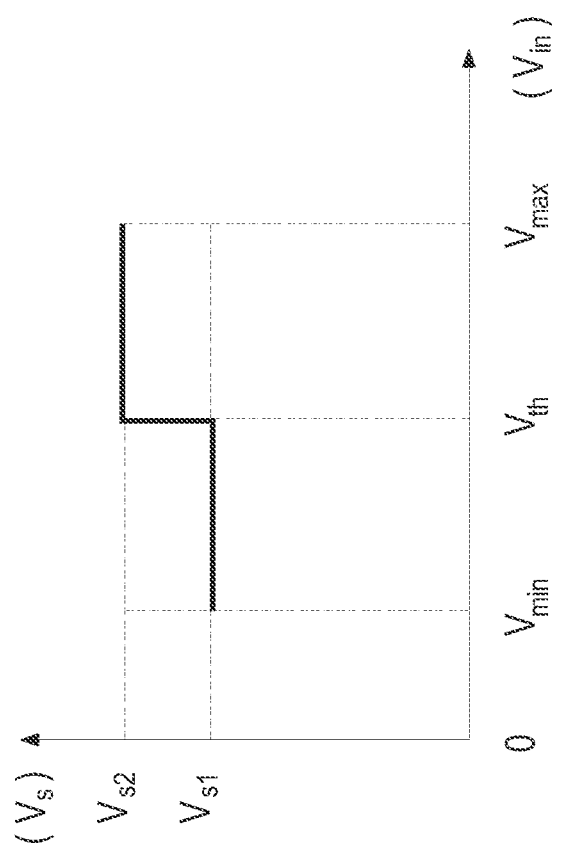
FIG. 7 is a plot illustrating the relation between the transition voltage and the input voltage of the front-stage voltage-regulating circuit as shown in FIG. 3.
Figure 8:
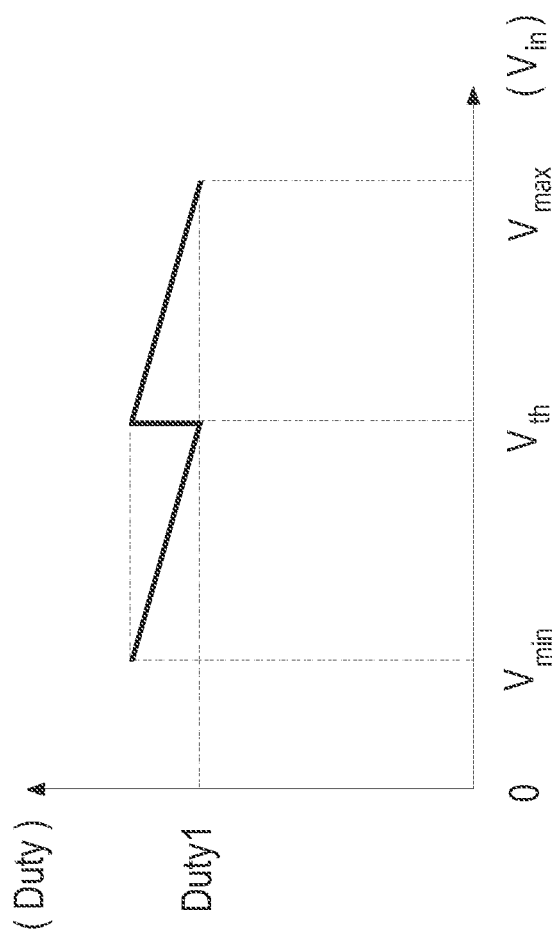
FIG. 8 is a plot illustrating the relation between the duty cycle of the switch element and the input voltage of the front-stage voltage-regulating circuit as shown in FIG. 3.

Hereinafter, the operations of the reference voltage adjusting circuit 223 and the performance of the front-stage voltage-regulating circuit 2 will reference to FIGS. 6, 7 and 8. FIG. 6 is a plot illustrating the relation between the reference voltage and the feedback control signal of the front-stage voltage-regulating circuit as shown in FIG. 3. FIG. 7 is a plot illustrating the relation between the transition voltage and the input voltage of the front-stage voltage-regulating circuit as shown in FIG. 3. FIG. 8 is a plot illustrating the relation between the duty cycle of the switch element and the input voltage of the front-stage voltage-regulating circuit as shown in FIG. 3. When the input voltage $V_{in}$ is increased from zero to be higher than a minimum driving voltage $V_{min}$, the intermediate bus power system 1 is activated by the input voltage $V_{in}$. As such, the detected vin signal $V_t$ is increased from zero. In a case that the detected vin signal $V_t$ is lower than the preset voltage $V_{ad}$, the comparator 2230 issues a enabling signal (e.g. a high-level voltage). In response to the enabling signal, the voltage-adjustable switch element $S_3$ is conducted, and thus the first voltage-adjustable resistor $R_5$ and the second voltage-adjustable resistor $R_6$ are connected with each other in parallel. In this situation, the magnitude of the reference voltage $V_{ref}$ is maintained at a first reference voltage level $V_{ref1}$ (see FIG. 6). The first reference voltage level $V_{ref1}$ is for example $(R_5/R_6) \times 1.225/R_7 + 1.225$. As shown in FIGS. 7 and 8, in a case that the detected vin signal $V_t$ is lower than the preset voltage $V_{ad}$, the magnitude of the transition voltage $V_s$ is maintained at a first transition level $V_{s1}$. The first transition level $V_{s1}$ is for example $\{(R_3+R_4)/R4\} \times V_{ref1}$. After the input voltage $V_{in}$ is equal to the minimum driving voltage $V_{min}$, the duty cycle of the first switch element $S_1$ or the second switch element $S_2$ is continuously decreased.

When the input voltage $V_{in}$ is increased to a threshold voltage value $V_{th}$, the detected vin signal $V_t$ is just higher than the preset voltage $V_{ad}$, so that the comparator 2230 issues an disabling signal (e.g. a low-level voltage). In response to the disabling signal, the voltage-adjustable switch element $S_3$ is shut off. Meanwhile, the first voltage-adjustable resistor $R_5$ is in an open loop state. In this situation, the magnitude of the reference voltage $V_{ref}$ is increased to a second reference voltage level $V_{ref2}$ (see FIG. 6). The second reference voltage level $V_{ref2}$ is for example $(R_6 \times 1.225/R_7) + 1.225$. As shown in FIGS. 7 and 8, in a case that the detected vin signal $V_t$ is just higher than the preset voltage $V_{ad}$, the magnitude of the transition voltage $V_s$ is increased to a second transition level $V_{s2}$. The second transition level $V_{s2}$ is for example $\{(R_3+R_4)/R4\} \times V_{ref2}$. In addition, the duty cycle of the first switch element $S_1$ or the second switch element $S_2$ is abruptly increased from a first preset duty cycle Duty1. For example, the first preset duty cycle Duty1 is 60%.

As shown in FIG. 6, the reference voltage $V_{ref}$ outputted by the reference voltage adjusting circuit 223 is changed in subsection as with the increase of the detected vin signal $V_t$. In a case that the input voltage $V_{in}$ is increased to be higher than the threshold voltage value $V_{th}$ but lower than a maximum driving voltage $V_{max}$ and the detected vin signal $V_t$ is higher than the preset voltage $V_{ad}$, the magnitude of the reference voltage $V_{ref}$ is maintained at the second reference voltage level $V_{ref2}$, and the magnitude of the transition voltage $V_s$ is continuously maintained at the second transition level $V_{s2}$. After the input voltage $V_{in}$ is equal to the threshold voltage value $V_{th}$, the duty cycle of the first switch element $S_1$ or the second switch element $S_2$ is continuously decreased. However, as shown in FIG. 8, the duty cycle of the first switch element $S_1$ or the second switch element $S_2$ is still higher than the first preset duty cycle Duty1.

When the input voltage $V_{in}$ received by the front-stage voltage-regulating circuit 2 is increased from zero to be higher than the minimum driving voltage $V_{min}$, the duty cycle of the first switch element $S_1$ or the second switch element $S_2$ of the power conversion circuit 20 of the front-stage voltage-regulating circuit 2 starts to decrease. When the input voltage $V_{in}$ is increased to the threshold voltage value $V_{th}$, the duty cycle of the first switch element $S_1$ or the second switch element $S_2$ is abruptly increased from the first preset duty cycle Duty1. In a case that the input voltage $V_{in}$ is increased to be higher than the threshold voltage value $V_{th}$ but lower than a maximum driving voltage $V_{max}$, the duty cycle of the first switch element $S_1$ or the second switch element $S_2$ is still higher than the first preset duty cycle Duty1. As previously described, the duty cycle of the switch element of the conventional front-stage voltage-regulating circuit is continuously decreased as the input voltage is increased. Whereas, by using the front-stage voltage-regulating circuit 2 of the present invention, the conduction loss, the switching loss of the first switch element $S_1$ or the second switch element $S_2$ and the filtering loss of the first filtering inductor $L_1$ or the filtering circuit 203 will be reduced, and thus the operating performance is enhanced.

Figure 9:
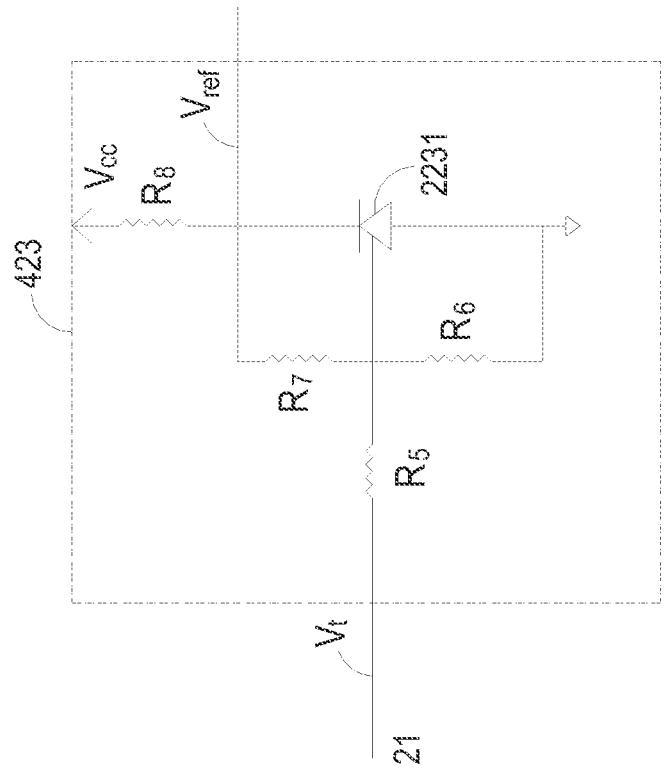
FIG. 9 is a schematic detailed circuit diagram illustrating a variant of the reference voltage adjusting circuit as shown in FIG. 3.
Figure 10:
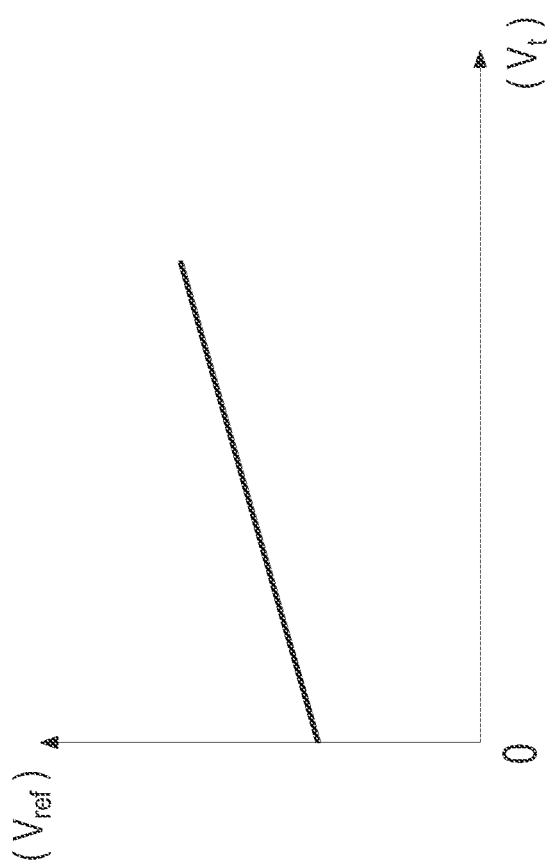
FIG. 10 is a plot illustrating the relation between the reference voltage and detected vin signal of the front-stage voltage-regulating circuit including the reference voltage adjusting circuit of FIG. 9.
Figure 11:
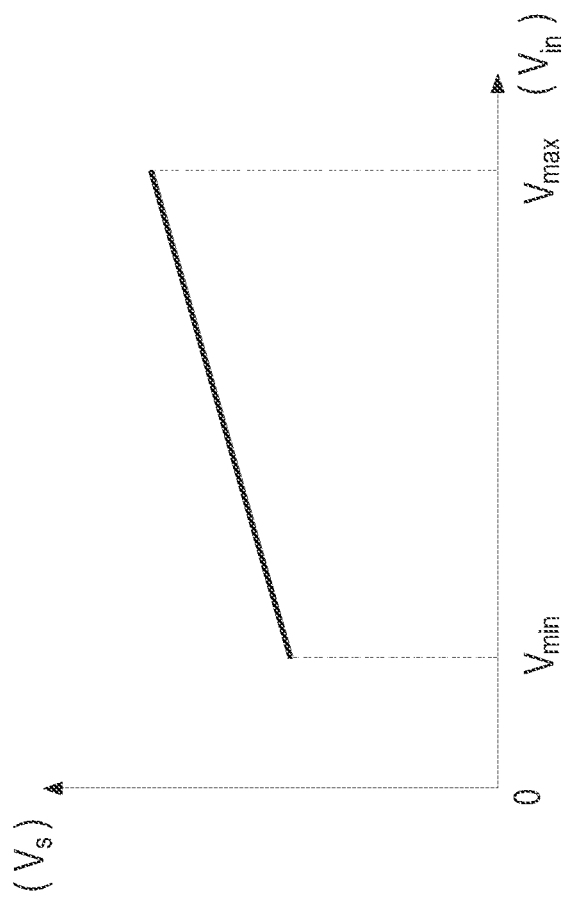
FIG. 11 is a plot illustrating the relation between the transition voltage and the input voltage of the front-stage voltage-regulating circuit including the reference voltage adjusting circuit of FIG. 9.
Figure 12:
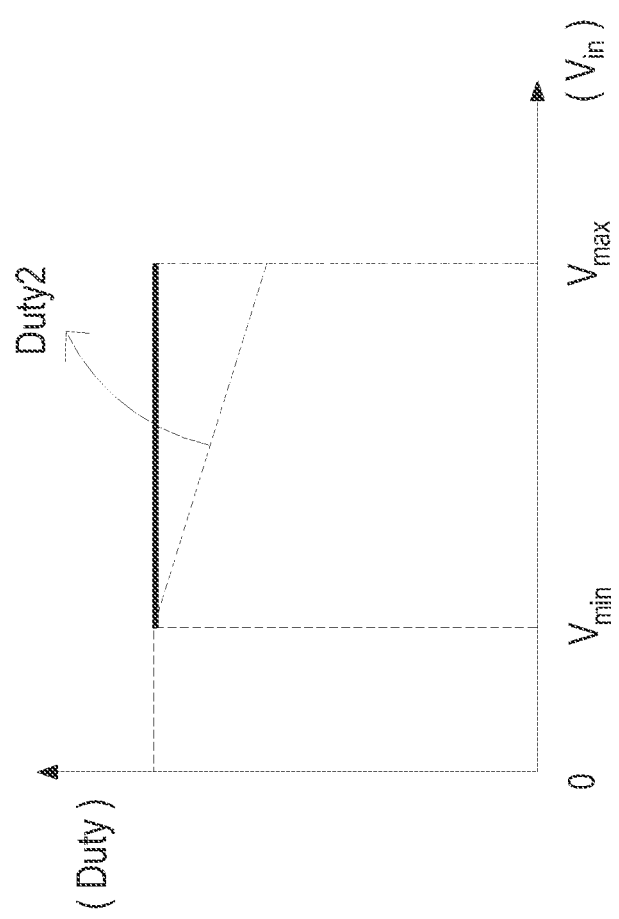
FIG. 12 is a plot illustrating the relation between the duty cycle of the switch element and the input voltage of the front-stage voltage-regulating circuit including the reference voltage adjusting circuit of FIG. 9.

FIG. 9 is a schematic detailed circuit diagram illustrating a variant of the reference voltage adjusting circuit as shown in FIG. 5. FIG. 10 is a plot illustrating the relation between the reference voltage and the detected $V_{in}$ signal of the front-stage voltage-regulating circuit including the reference voltage adjusting circuit of FIG. 9. FIG. 11 is a plot illustrating the relation between the transition voltage and the input voltage of the front-stage voltage-regulating circuit including the reference voltage adjusting circuit of FIG. 9. FIG. 12 is a plot illustrating the relation between the duty cycle of the switch element and the input voltage of the front-stage voltage-regulating circuit including the reference voltage adjusting circuit of FIG. 9. Except that the comparator 2230 and the voltage-adjustable switch element $S_3$ are omitted, the components of the reference voltage adjusting circuit 423 are substantially identical to those of the reference voltage adjusting circuit 223 of FIG. 5. In addition, the first voltage-adjustable resistor $R_5$ is interconnected between the $V_{in}$ voltage-detecting circuit 21 and the feedback terminal "c" of the voltage-adjustable regulator 2231 for receiving the detected vin signal $V_t$. The first voltage-adjustable resistor $R_5$ is also connected to the second voltage-adjustable resistor $R_6$ and the third voltage-adjustable resistor $R_7$. That is, the reference voltage $V_{ref}$ outputted from the voltage-adjustable regulator 2231 is equal to $1.225+1.225\times(R_5/R_6)/R_7+V_t\times(R_5/R_6)/R_5$. Since the resistances of the first voltage-adjustable resistor $R_5$, the second voltage-adjustable resistor $R_6$ and the third voltage-adjustable resistor $R_7$ are constant values, it is meant that the reference voltage $V_{ref}$ is changed with the detected vin signal $V_t$ linearly. As shown in FIGS. 10 and 11, when the input voltage $V_{in}$ is increased from the minimum driving voltage $V_{min}$ to the maximum driving voltage $V_{max}$, the detected vin signal $V_t$ is continuously increased, and thus the reference voltage $V_{ref}$ outputted by the reference voltage adjusting circuit 223 is continuously increased.

When the input voltage $V_{in}$ is increased from the minimum driving voltage $V_{min}$ to the maximum driving voltage $V_{max}$, the transition voltage $V_s$ is continuously increased, since the reference voltage $V_{ref}$ is continuously increased, and the divided transition voltage $V_s$ from the third voltage-division circuit 221 should be equal to the reference voltage $V_{ref}$. As a result, the duty cycle of the first switch element $S_1$ or the second switch element $S_2$ is controlled to keep the same instead of decrease, as with the increase of the input voltage $V_{in}$. The duty cycle is higher than a second preset duty cycle Duty2. For example, the second preset duty cycle Duty2 is 60%.

Figure 13:
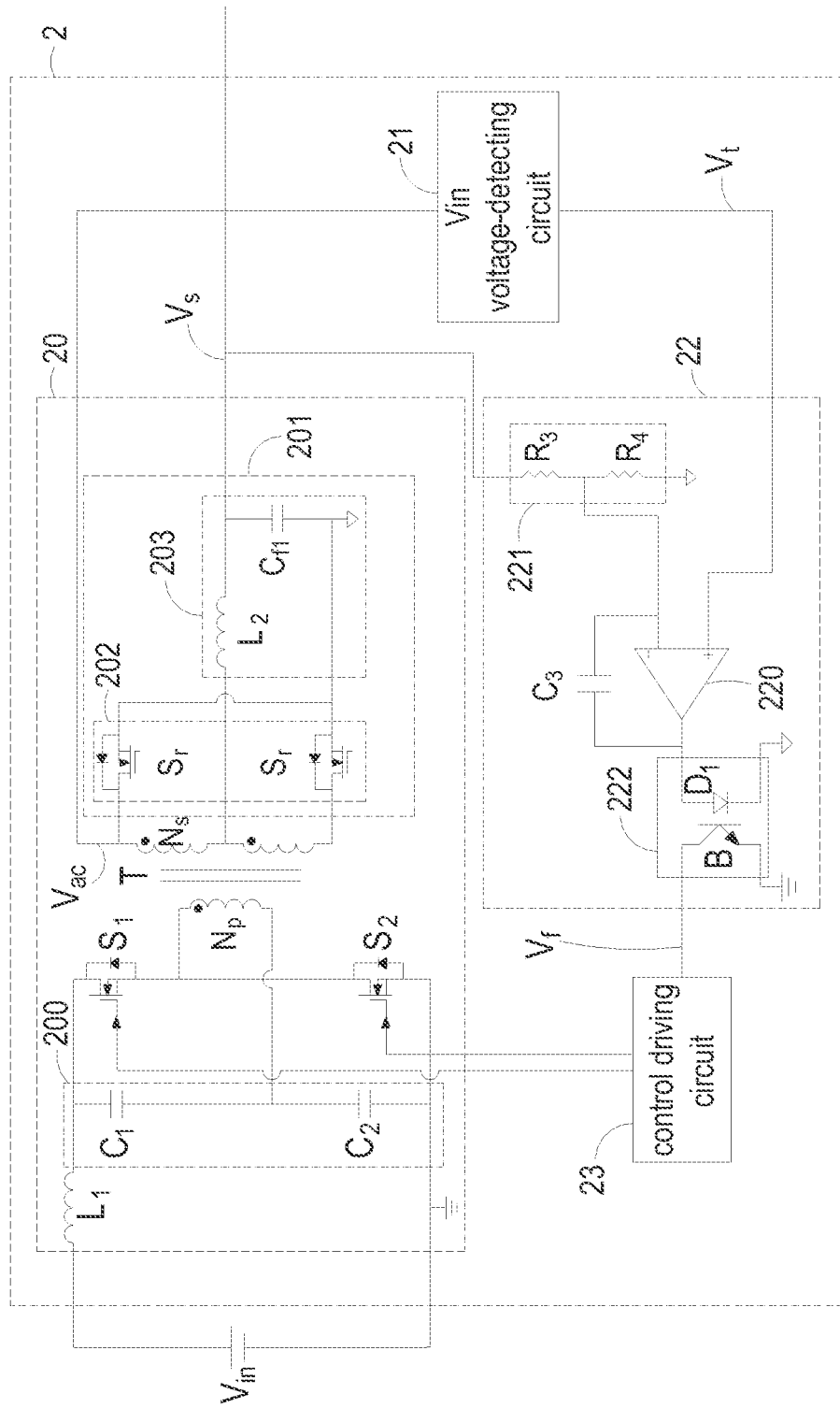
FIG. 13 is a schematic detailed circuit diagram illustrating a front-stage voltage-regulating circuit according to another embodiment of the present invention.

FIG. 13 is a schematic detailed circuit diagram illustrating a front-stage voltage-regulating circuit according to another embodiment of the present invention. In comparison with FIG. 3, no reference voltage adjusting circuit 223 is included in the feedback circuit 22 of the front-stage voltage-regulating circuit of FIG. 13. In this embodiment, the positive input terminal of the first operational amplifier 220 of the feedback circuit 22 is connected to the $V_{in}$ voltage-detecting circuit 21 for receiving the detected vin signal $V_t$. As such, the reference voltage received by the positive input terminal of the first operational amplifier 220 is equal to the detected vin signal $V_t$. That is, as the input voltage $V_{in}$ is increased, the detected vin signal $V_t$ is also increased. The transition voltage $V_s$ is continuously increased, since the divided transition voltage $V_s$ from the third voltage-division circuit 221 should be equal to the detected vin signal $V_t$. Under control of the control driving circuit 23, the duty cycle of the first switch element $S_1$ or the second switch element $S_2$ is controlled to keep the same instead of decrease, as with the increase of the input voltage $V_{in}$. The duty cycle is controlled to be higher than a third preset duty cycle (not shown).

Please refer to FIG. 13 again, the control driving circuit 23 can be a pulse width modulate control driving circuit. It can also be a pulse frequency modulate control driving circuit which is used for the application when the power conversion circuit 20 is a pulse frequency modulate resonant converter.

Figure 14:
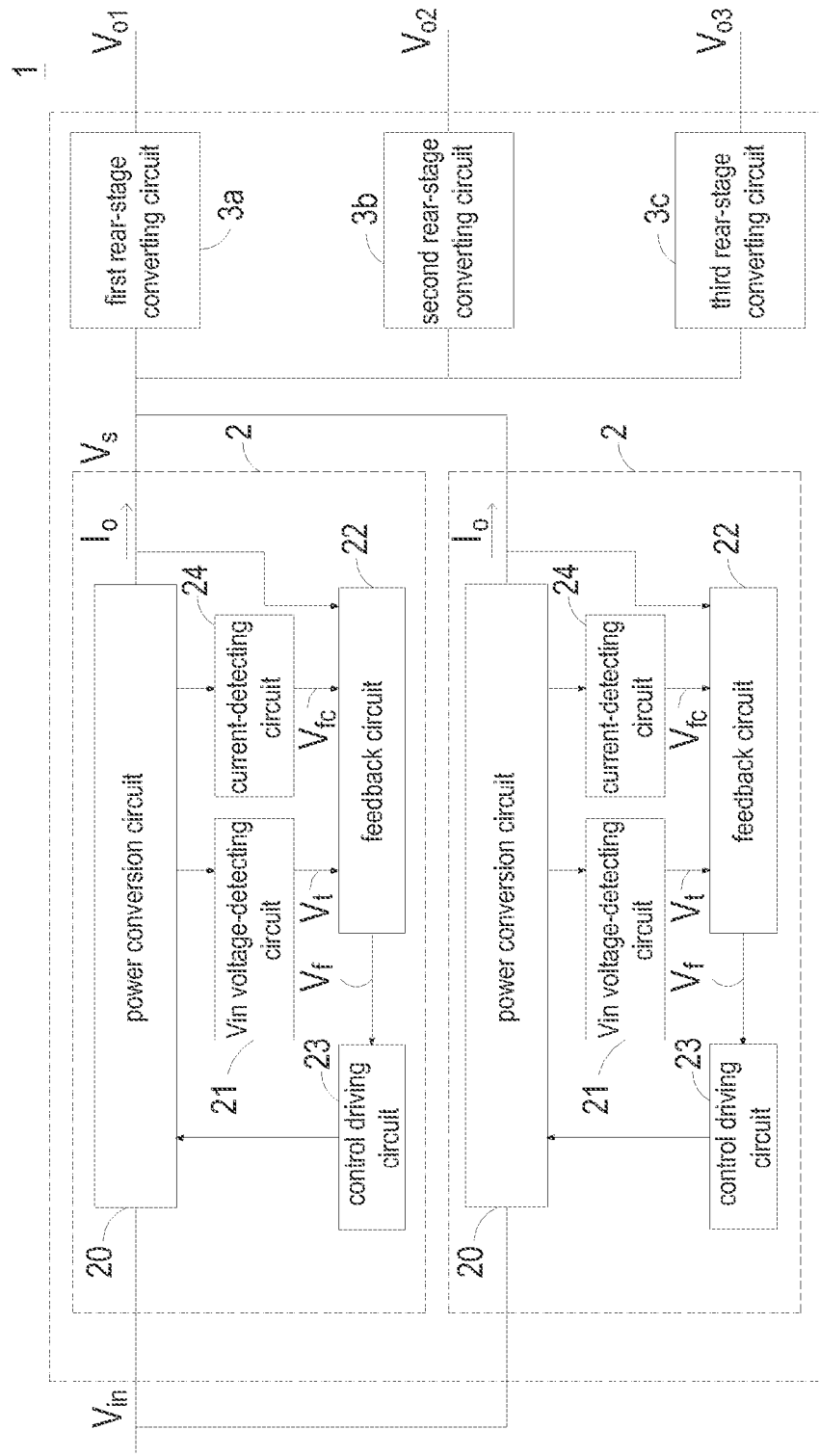
FIG. 14 is a block diagram illustrating an intermediate bus power system according to another embodiment of the present invention.

FIG. 14 is a block diagram illustrating an intermediate bus power system according to another embodiment of the present invention. As shown in FIG. 14, the intermediate bus power system comprises plural front-stage voltage-regulating circuits 2. The front-stage voltage-regulating circuits 2 are connected with each other in parallel to define a parallel voltage-regulating circuit system. As such, the front-stage voltage-regulating circuits 2 may provide higher output power to the rear-stage conversion circuit. According to a current-sharing technique, the magnitudes of the output current $I_o$ of all front-stage voltage-regulating circuits 2 are adjusted to be equal. In this embodiment, each of the front-stage voltage-regulating circuits 2 further comprises a current-detecting circuit 24. The current-detecting circuit 24 is connected to the power conversion circuit 20 and the feedback circuit 22 for detecting a conversion current corresponding to the output circuit $I_o$ and from the power conversion circuit 20, thereby outputting a detected current signal $V_{fc}$ to the feedback circuit 22. According to the detected current signal $V_{fc}$, the detected vin signal $V_t$, and the transition voltage $V_s$, the feedback circuit 22 generates the feedback control signal $V_f$. According to the feedback control signal $V_f$, the control driving circuit 23 adjusts the duty cycle of the first switch element $S_1$ or the second switch element $S_2$, thereby changing the transition voltage $V_s$ of the front-stage voltage-regulating circuits 2. Except the transition voltage $V_s$ is adjusted with the input voltage $V_{in}$, the output circuit $I_o$ of the front-stage voltage-regulating circuits 2 is adjusted to be equal to the output circuit $I_o$ of any other front-stage voltage-regulating circuits 2. For example, if the output circuit $I_o$ from one of the plural front-stage voltage-regulating circuits 2 is too large, the current-detecting circuit 24 issues a detected current signal $V_{fc}$ to the feedback circuit 22. According to the detected current signal $V_{fc}$ and the detected vin signal $V_t$, the feedback circuit 22 generates the feedback control signal $V_f$. According to the feedback control signal $V_{fc}$ the control driving circuit 23 adjusts the duty cycle of the first switch element $S_1$ or the second switch element $S_2$, thereby reducing the transition voltage $V_s$ of the front-stage voltage-regulating circuit 2. As such, the output circuit $I_o$ of the front-stage voltage-regulating circuit 2 is reduced to be equal to the output circuit $I_o$ of any other front-stage voltage-regulating circuits 2.

Figure 15:
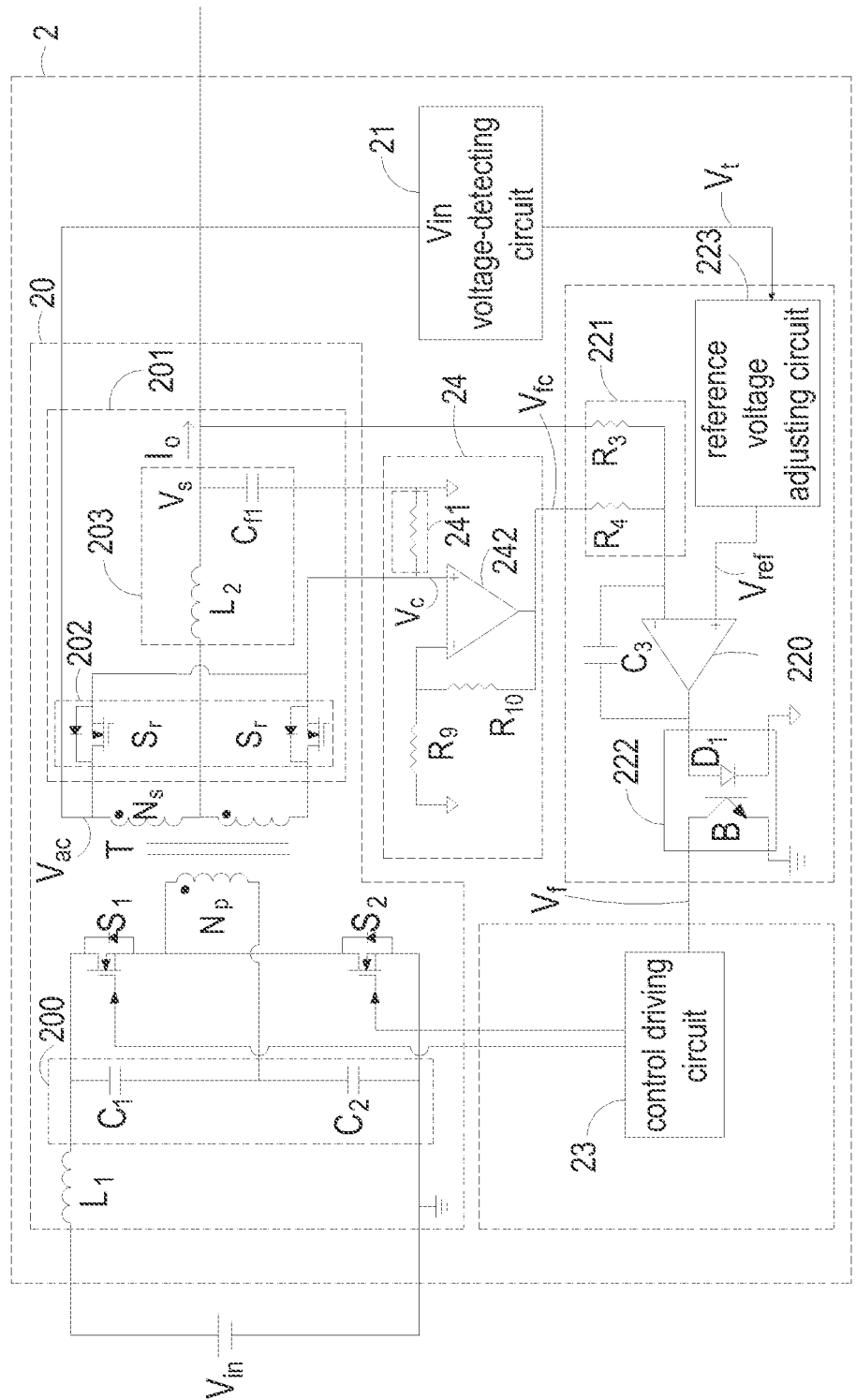
FIG. 15 is a schematic circuit diagram illustrating the front-stage voltage-regulating circuit of the intermediate bus power system as shown in FIG. 14.

FIG. 15 is a schematic circuit diagram illustrating the front-stage voltage-regulating circuit of the intermediate bus power system as shown in FIG. 14. As shown in FIG. 15, the current-detecting circuit 24 comprises a sensor 241, a signal amplifier 242, a first amplifier ratio adjusting resistor $R_9$ and a second amplifier ratio adjusting resistor $R_{10}$. The sensor 241 includes one or more resistor. Alternatively, the sensor 241 can be any current detect component, for example current transformer or Hall-Effect current sensor, conduction resistance of the synchronous rectifier switches $S_r$, and so on. The sensor 241 is connected to the output terminal of the secondary-side circuit 201 for detecting a conversion current corresponding to the output circuit $I_o$. In this embodiment, the conversion current is equal to the output circuit $I_o$. In response to the conversion current, the sensor 241 issues a current-sensing signal $V_c$. The signal amplifier 242, the first amplifier ratio adjusting resistor $R_9$ and the second amplifier ratio adjusting resistor $R_{10}$ collectively define a signal amplifier circuit. The signal amplifier circuit is connected to the sensor 241 and the fourth resistor $R_4$ for adjusting the current-sensing signal $V_c$. For example, after the current-sensing signal $V_c$ is amplified by $R_{10}/R_9$ times, the detected current signal $V_{fc}$ is generated. The detected current signal $V_{fc}$ is transmitted to the negative input terminal of the first operational amplifier 220 through the fourth resistor $R_4$. According to the detected current signal $V_{fc}$, the divided transition voltage $V_s$ from the third voltage-division circuit 221 and the detected vin signal $V_r$, the first operational amplifier 220 generates the feedback control signal $V_f$. According to the feedback control signal $V_f$, the duty cycle of the first switch element $S_1$ or the second switch element $S_2$ is controlled by the control driving circuit 23 to adjust the transition voltage $V_s$. As such, the output circuit $I_o$ of the front-stage voltage-regulating circuits 2 is adjusted to be equal to the output circuit $I_o$ of any other front-stage voltage-regulating circuits 2.

In this embodiment, the conversion current detected by the sensor 241 is equal to the output circuit $I_o$. Depending on the position and type of the sensor 241, the conversion current may be varied.

Figure 16:
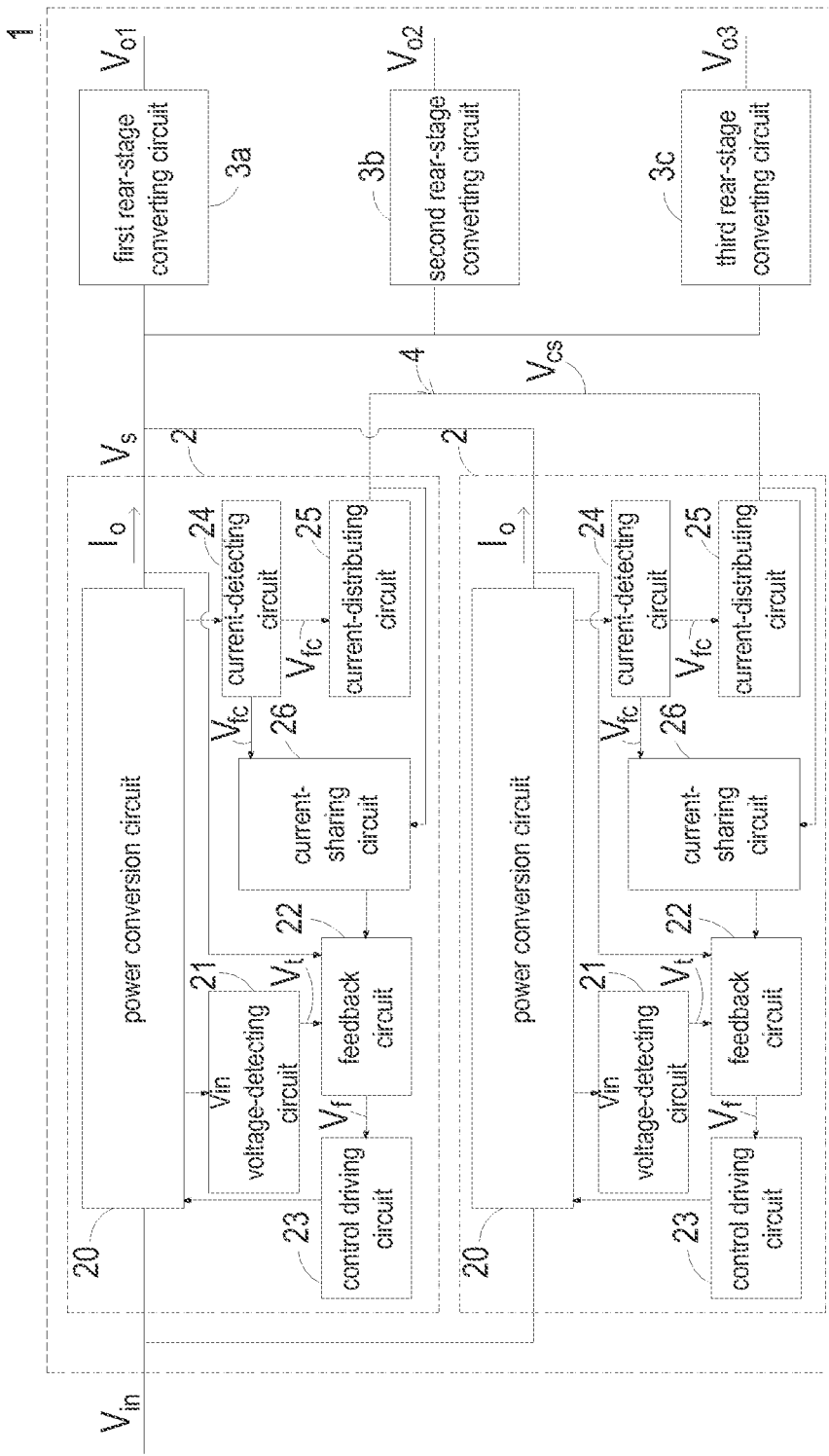
FIG. 16 is a block diagram illustrating a variant of an intermediate bus power system as shown in FIG. 14.

FIG. 16 is a block diagram illustrating a variant of an intermediate bus power system as shown in FIG. 14. In comparison with FIG. 14, each front-stage voltage-regulating circuit 2 of the intermediate bus power system 1 of FIG. 16 further comprises a current-distributing circuit 25, a current-sharing circuit 26 and a current sharing bus 4. The current-detecting circuit 24 is connected to the power conversion circuit 20, the current-distributing circuit 25 and a current-sharing circuit 26.

The current-distributing circuit 25 is connected to the current-detecting circuit 24, and connected to the current-distributing circuits 25 of other front-stage voltage-regulating circuits 2 through the current sharing bus 4. The detected current signal $V_{fc}$ from the current-detecting circuit 24 is received by the current-distributing circuit 25, and a current sharing bus signal $V_{cs}$ is transmitted to the current sharing bus 4, which indicates the average value of the output circuits $I_o$ of the plural front-stage voltage-regulating circuits 2 or the maximum current value among the output circuits $I_o$ of the plural front-stage voltage-regulating circuits 2. The current-sharing circuit 26 is connected to the current-detecting circuit 24, the current sharing bus 4 and the feedback circuit 22. According to the difference between the detected current signal $V_{fc}$ and the current sharing bus signal $V_{cs}$, the feedback control signal $V_f$ is dynamically adjusted by the feedback circuit 22. According to the feedback control signal $V_f$, the control driving circuit 23 adjusts the duty cycle of the first switch element $S_1$ or the second switch element $S_2$, thereby adjusting the output circuit $I_o$ of the front-stage voltage-regulating circuit 2. Except the transition voltage $V_s$ is adjusted with the input voltage $V_{in}$, the detected current signal $V_{fc}$ is adjusted to equal to the current sharing bus signal $V_{cs}$. As such, the output circuit $I_o$ of the front-stage voltage-regulating circuits 2 is adjusted to be equal to the output circuit $I_o$ of any other front-stage voltage-regulating circuits 2.

Figure 17:
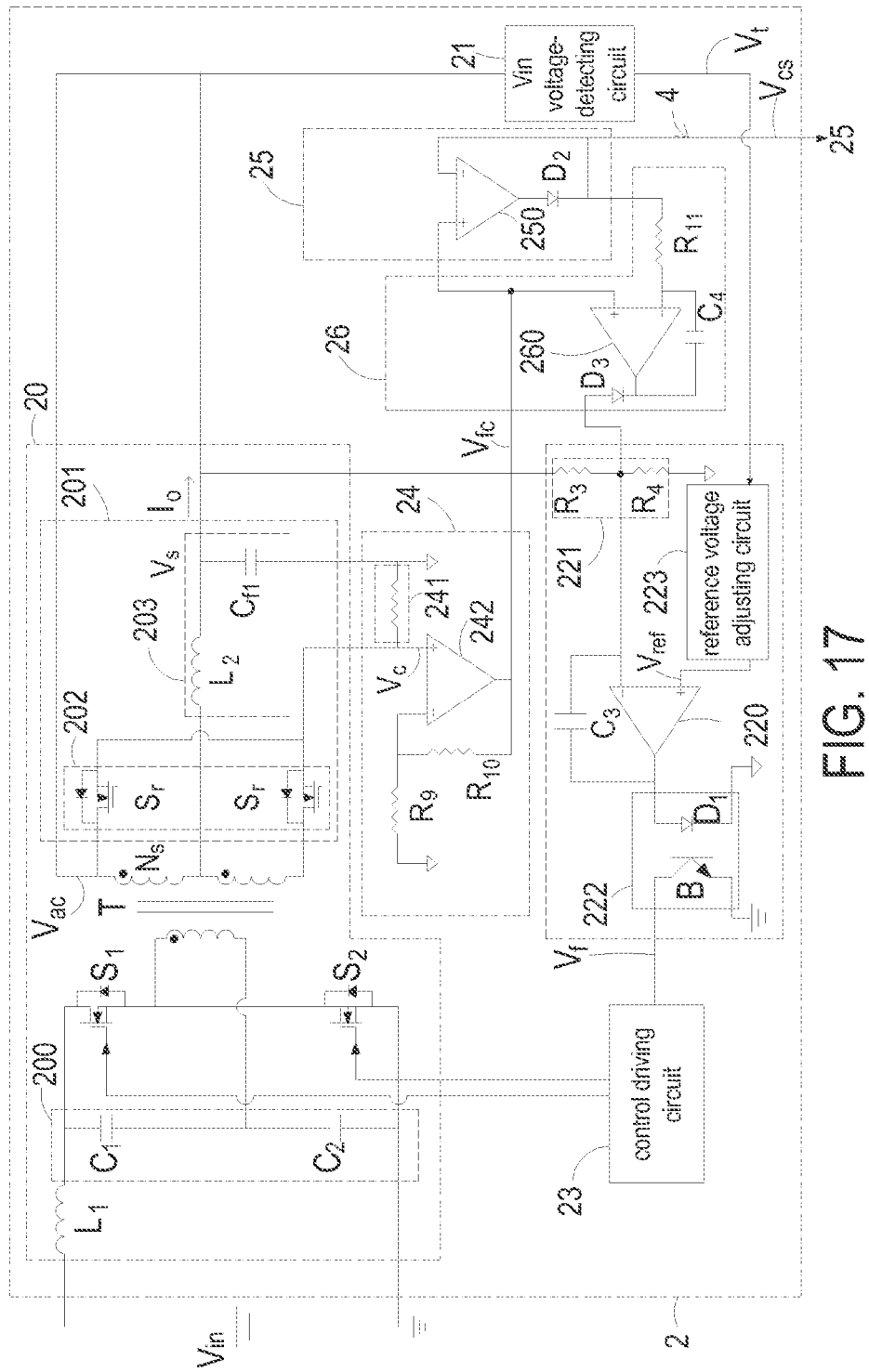
FIG. 17 is a schematic detailed circuit diagram illustrating the front-stage voltage-regulating circuit as shown in FIG. 16.

FIG. 17 is a schematic detailed circuit diagram illustrating the front-stage voltage-regulating circuit as shown in FIG. 16. As shown in FIG. 17, the current-distributing circuit 25 of each front-stage voltage-regulating circuit 2 comprises a second operational amplifier 250 and a first reverse-current isolation diode $D_2$. The positive input terminal of the second operational amplifier 250 is connected to the current-detecting circuit 24 for receiving the detected current signal $V_{fc}$. The negative input terminal of the second operational amplifier 250 is connected to the current-distributing circuits 25 of other front-stage voltage-regulating circuits 2 through the current sharing bus 4. The output terminal of the second operational amplifier 250 is connected to the anode of the first reverse-current isolation diode $D_2$. The detected current signal $V_{fc}$ inputted into the positive input terminal of the second operational amplifier 250 can be communicated with the detected current signal from the current-distributing circuits 25 of other front-stage voltage-regulating circuits 2. As such, the current sharing bus signal $V_{cs}$ is outputted from the first reverse-current isolation diode $D_2$.

The current-sharing circuit 26 comprises a second reverse-current isolation diode $D_3$, a third operational amplifier 260, a fifth resistor $R_{11}$ and a fourth capacitor $C_4$. The negative input terminal of the third operational amplifier 260 is connected to the cathode of the first reverse-current isolation diode $D_2$ through the fifth resistor $R_{11}$ for receiving the current sharing bus signal $V_{cs}$. The positive input terminal of the third operational amplifier 260 is connected to the current-detecting circuit 24 for receiving the detected current signal $V_{fc}$. The output terminal of the third operational amplifier 260 is connected to the cathode of the second reverse-current isolation diode $D_3$. The anode of the second reverse-current isolation diode $D_3$ is connected to the negative input terminal of the first operational amplifier 220. The third operational amplifier 260, the fifth resistor $R_{11}$ and the fourth capacitor $C_4$ collectively defines an integrator. The integrator is connected to the current-detecting circuit 24 and the current sharing bus 4. The difference between the detected current signal $V_{fc}$ and the current sharing bus signal $V_{cs}$ is processed by the integrator, and the processing result is transmitted to the feedback circuit 22 through the second reverse-current isolation diode $D_3$. According to the difference between the detected current signal $V_{fc}$ and the current sharing bus signal $V_{cs}$, the feedback control signal $V_f$ is dynamically adjusted by the feedback circuit 22. According to the feedback control signal $V_f$, the control driving circuit 23 adjusts the duty cycle of the first switch element $S_1$ or the second switch element $S_2$, thereby adjusting the output circuit $I_o$ of the front-stage voltage-regulating circuit 2. Meanwhile, the detected current signal $V_{fc}$ is equal to the current sharing bus signal $V_{cs}$. As such, the output circuit $I_o$ of the front-stage voltage-regulating circuits 2 is adjusted to be equal to the output circuit $I_o$ of any other front-stage voltage-regulating circuits 2.

From the above description, the front-stage voltage-regulating circuit of an intermediate bus power system according to the present invention comprises a power conversion circuit, a $V_{in}$ voltage-detecting circuit, a feedback circuit and a control driving circuit. The $V_{in}$ voltage-detecting circuit is used for detecting a conversion voltage corresponding to the input voltage and from said power conversion circuit. According to the conversion voltage and a transition voltage from the power conversion circuit, the feedback circuit issues a feedback control signal. According to the feedback control signal, the control driving circuit controls a duty cycle of the switch element. In such way, as the input voltage is increased, the duty cycle of the switch element is controlled to be higher than a preset duty cycle. As a consequence, the front-stage voltage-regulating circuit of the present invention has reduced conduction loss, switching loss and filtering loss and enhanced operating performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage-regulating circuit comprising:
a power conversion circuit comprising at least one switch element, wherein during operation of said at least one switch element, an input voltage is converted into a transition voltage;
an input voltage detecting circuit connected to said power conversion circuit for outputting a detected voltage signal corresponding to said input voltage;
a feedback circuit connected to said power conversion circuit and said input voltage detecting circuit, wherein said feedback circuit receives said transition voltage and said detected voltage signal, and generates a feedback control signal according to said transition voltage and said detected voltage signal; and
a control driving circuit connected to said switch element and said feedback circuit for receiving said feedback control signal, and controlling a duty cycle of said switch element to be higher than a preset duty cycle according to said feedback control signal;
wherein as said input voltage is changed, said feedback circuit will adjust to make said transition voltage changed as with the change of said detected voltage signal corresponding to said input voltage.

2. The voltage-regulating circuit according to claim 1 wherein said power conversion circuit is a pulse width modulating converter.

3. The voltage-regulating circuit according to claim 1 wherein said power conversion circuit is a pulse frequency modulating resonant converter.

4. The voltage-regulating circuit according to claim 1 wherein said power conversion circuit further comprises:
a filtering inductor for filtering said input voltage;
a transformer comprising at least a primary winding and at least a secondary winding;
a first voltage-division circuit connected to said filtering inductor and said transformer for dividing said input voltage into a divided input voltage, and providing said divided input voltage to said at least a primary winding of said transformer; and
a secondary-side circuit electrically connected to said at least a secondary winding of said transformer for rectifying and filtering an induction AC voltage from said at least a secondary winding of said transformer, thereby generating said transition voltage.

5. The voltage-regulating circuit according to claim 4 wherein said input voltage detecting circuit is connected to said secondary winding of said transformer or said primary winding of said transformer or an input terminal of said filtering inductor or said first voltage-division circuit or said secondary-side circuit.

6. The voltage-regulating circuit according to claim 1 wherein said feedback circuit comprises a first operational amplifier which is connected to a reference voltage adjusting circuit.

7. The voltage-regulating circuit according to claim 6 wherein said reference voltage adjusting circuit is interconnected between said first operational amplifier and said input voltage detecting circuit for generating a reference voltage.

8. The voltage-regulating circuit according to claim 6 wherein said reference voltage adjusting circuit is changed in steps or be changed continuously as with the change of detected signal corresponding to said input voltage.

9. The voltage-regulating circuit according to claim 8 wherein said transition voltage is changed in steps or be changed continuously as with the change of detected signal corresponding to said input voltage.

10. The voltage-regulating circuit according to claim 1 wherein said voltage-regulating circuit is a front-stage voltage-regulating circuit of an intermediate bus power system, wherein at least one rear-stage conversion circuit connected to said front-stage voltage-regulating circuits for converting said transition voltage into a working voltage.

11. A parallel voltage-regulating circuit system comprising:
plural voltage-regulating circuits, wherein plural voltage-regulating circuits are parallel, and each of said voltage-regulating circuits comprises:
a power conversion circuit comprising at least one switch element, wherein during operation of said at least one switch element, an input voltage is converted into a transition voltage with an output current;
an input voltage detecting circuit connected to said power conversion circuit for outputting a detected voltage signal corresponding to said input voltage;
a current-detecting circuit connected to said power conversion circuit for outputting a detected current signal corresponding to said output current;
a feedback circuit connected to said power conversion circuit, said current-detecting circuit and said input voltage detecting circuit, wherein said feedback circuit receives said transition voltage, said detected voltage signal and said detected current signal, and generates a feedback control signal according to said transition voltage, said detected voltage signal and said detected current signal; and
a control driving circuit connected to said switch element and said feedback circuit for receiving said feedback control signal, and controlling a duty cycle of said switch element to be higher than a preset duty cycle according to said feedback control signal;
wherein as said input voltage is changed, said feedback circuit will adjust to make said transition voltage changed as with the change of said detected voltage signal corresponding to said input voltage.

12. The parallel voltage-regulating circuit system according to claim 11 wherein said power conversion circuit is a pulse width converter.

13. The parallel voltage-regulating circuit system according to claim 11 wherein said power conversion circuit is a pulse frequency modulating resonant converter.

14. The parallel voltage-regulating circuit system according to claim 11 wherein said power conversion circuit further comprises:
a filtering inductor for filtering said input voltage;
a transformer comprising at least a primary winding and at least a secondary winding;
a first voltage-division circuit connected to said filtering inductor and said transformer for dividing said input voltage into a divided input voltage, and providing said divided input voltage to said at least a primary winding of said transformer; and
a secondary-side circuit electrically connected to said at least a secondary winding of said transformer for rectifying and filtering an induction AC voltage from said at least a secondary winding of said transformer, thereby generating said transition voltage.

15. The parallel voltage-regulating circuit system according to claim 14 wherein said input voltage detecting circuit is connected to said secondary winding of said transformer or said primary winding of said transformer or an input terminal of said filtering inductor or said first voltage-division circuit or said secondary-side circuit.

16. The parallel voltage-regulating circuit system according to claim 11 wherein said feedback circuit comprises a first operational amplifier which is connected to a reference voltage adjusting circuit.

17. The parallel voltage-regulating circuit system according to claim 16 wherein said reference voltage adjusting circuit is interconnected between said first operational amplifier and said input voltage detecting circuit for generating a reference voltage.

18. The parallel voltage-regulating circuit system according to claim 16 wherein said reference voltage adjusting circuit is changed in steps or be changed continuously as with the change of detected signal corresponding to said input voltage.

19. The parallel voltage-regulating circuit system according to claim 11 wherein said transition voltage is changed in steps or be changed continuously as with the change of detected signal corresponding to said input voltage.

20. The parallel voltage-regulating circuit system according to claim 11 wherein said voltage-regulating circuit is a front-stage voltage-regulating circuit of a intermediate bus power system, wherein at least one rear-stage conversion circuit connected to said front-stage voltage-regulating circuit for converting said transition voltage into a working voltage.

21. A parallel voltage-regulating circuit system comprising:
 plural voltage-regulating circuits, wherein plural voltage-regulating circuits are parallel and connected together by a current sharing bus, and each of said voltage-regulating circuits comprises:
 a power conversion circuit comprising at least one switch element, wherein during operation of said at least one switch element, an input voltage is converted into a transition voltage with an output current;
 an input voltage detecting circuit connected to said power conversion circuit for outputting a detected voltage signal corresponding to said input voltage;
 a current-detecting circuit connected to said power conversion circuit for outputting a detected current signal corresponding to said output current;
 a feedback circuit connected to said power conversion circuit, said current-detecting circuit and said input voltage detecting circuit, wherein said feedback circuit receives said transition voltage, said detected voltage signal and said detected current signal, and generates a feedback control signal according to said transition voltage, said detected voltage signal and said detected current signal; and
 a control driving circuit connected to said switch element and said feedback circuit for receiving said feedback control signal, and controlling a duty cycle of said switch element to be higher than a preset duty cycle according to said feedback control signal;
 wherein as said input voltage is changed, said feedback circuit will adjust to make said transition voltage changed as with the change of said detected voltage signal corresponding to said input voltage; and
 wherein as said detected current signal is not equal to a signal on said current sharing bus, said feedback circuit will adjust to make said detected current signal equal to said signal on said current sharing bus.

22. The parallel voltage-regulating circuit system according to claim 21 wherein said power conversion circuit is a pulse width modulating converter.

23. The parallel voltage-regulating circuit system according to claim 21 wherein said power conversion circuit is a pulse frequency modulating resonant converter.

24. The parallel voltage-regulating circuit system according to claim 21 wherein said power conversion circuit further comprises:
 a filtering inductor for filtering said input voltage;
 a transformer comprising at least a primary winding and at least a secondary winding;
 a first voltage-division circuit connected to said filtering inductor and said transformer for dividing said input voltage into a divided input voltage, and providing said divided input voltage to said at least a primary winding of said transformer; and
 a secondary-side circuit electrically connected to said at least a secondary winding of said transformer for rectifying and filtering an induction AC voltage from said at least a secondary winding of said transformer, thereby generating said transition voltage.

25. The parallel voltage-regulating circuit system according to claim 24 wherein said input voltage detecting circuit is connected to said secondary winding of said transformer or said primary winding of said transformer or an input terminal of said filtering inductor or said first voltage-division circuit or said secondary-side circuit.

26. The parallel voltage-regulating circuit system according to claim 21 wherein said feedback circuit comprises a first operational amplifier which is connected to a reference voltage adjusting circuit.

27. The parallel voltage-regulating circuit system according to claim 26 wherein said reference voltage adjusting circuit is interconnected between said first operational amplifier and said input voltage detecting circuit for generating a reference voltage.

28. The parallel voltage-regulating circuit system according to claim 26 wherein said reference voltage adjusting circuit is changed in steps or be changed continuously as with the change of detected signal corresponding to said input voltage.

29. The parallel voltage-regulating circuit system according to claim 21 wherein said transition voltage is changed in steps or be changed continuously as with the change of detected signal corresponding to said input voltage.

30. The parallel voltage-regulating circuit system according to claim 21 wherein said voltage-regulating circuit is a front-stage voltage-regulating circuit of an intermediate bus power system, wherein at least one rear-stage conversion circuit connected to said front-stage voltage-regulating circuit for converting said transition voltage into a working voltage.

* * * * *